United States Patent
Ito et al.

(10) Patent No.: US 7,238,069 B2
(45) Date of Patent: Jul. 3, 2007

(54) OUTBOARD MOTOR

(75) Inventors: Yu Ito, Shizuoka-ken (JP); Mitsuru Nagashima, Shizuoka-ken (JP); Noriyoshi Hiraoka, Shizuoka-ken (JP); Masanori Takahashi, Shizuoka-ken (JP)

(73) Assignee: Yamaha Marine Kabushiki Kaisha (JP)

( * ) Notice: Subject to any disclaimer, the term of this patent is extended or adjusted under 35 U.S.C. 154(b) by 0 days.

(21) Appl. No.: 11/288,547

(22) Filed: Nov. 29, 2005

(65) Prior Publication Data

US 2006/0116035 A1     Jun. 1, 2006

(30) Foreign Application Priority Data

Nov. 30, 2004   (JP)   ............................ 2004-345949

(51) Int. Cl.
    *B63H 20/32*   (2006.01)
(52) U.S. Cl. ........................................ 440/77; 440/88 A
(58) Field of Classification Search ................. 440/76, 440/77, 88 A; 123/195 C, 195 P
    See application file for complete search history.

(56) References Cited

U.S. PATENT DOCUMENTS

| 4,379,702 | A | * | 4/1983 | Takada et al. ................. 440/77 |
| 4,968,276 | A |   | 11/1990 | Hashimoto |
| 4,978,321 | A | * | 12/1990 | Ferguson ................. 123/195 C |
| 5,873,755 | A | * | 2/1999 | Takahashi et al. ............ 440/77 |
| 5,928,043 | A | * | 7/1999 | Rinzaki ....................... 440/77 |
| 5,938,491 | A |   | 8/1999 | Kawai et al. |
| 6,099,372 | A | * | 8/2000 | Toyama ....................... 440/77 |
| 6,132,273 | A | * | 10/2000 | Nakayama et al. ........... 440/77 |
| 6,623,319 | B2 | * | 9/2003 | Isogawa ....................... 440/77 |
| 6,964,255 | B2 | * | 11/2005 | Shomura et al. .............. 440/77 |

FOREIGN PATENT DOCUMENTS

| JP | A-HEI 01-273789 | 11/1989 |
| JP | A-HEI 11-34984 | 2/1999 |

* cited by examiner

*Primary Examiner*—Lars A. Olson
(74) *Attorney, Agent, or Firm*—Knobbe, Martens, Olson & Bear, LLP.

(57) ABSTRACT

An outboard motor has a cowling for enclosing an engine. Air inlet openings are formed in the cowling. An air intake chamber connects the air inlet openings and an air intake duct. Air that flows through the air inlet openings passes through the air intake chamber to the air intake duct. The air is then introduced into the engine. A front wall of the air intake chamber has a center portion positioned rearwardly of outer portions of the front wall. The air intake duct is positioned rearwardly of the front wall of the air intake chamber. The air inlet openings are positioned on both sides of the air intake duct. A rear wall is positioned rearwardly of the air intake duct. Each of the air inlet openings extends from the rear wall to one of the outer ends of the front wall of the air intake chamber.

18 Claims, 10 Drawing Sheets

OUTBOARD MOTOR

PRIORITY INFORMATION

The present application is based on and claims priority under 35 U.S.C. § 119(a–d) to Japanese Patent Application No. 2004-345949, filed on Nov. 30, 2004, the entire contents of which is expressly incorporated by reference herein.

BACKGROUND OF THE INVENTION

1. Field of the Invention

The present invention generally relates to outboard motors and more particularly relates to cowlings that surround engines of outboard motors.

2. Description of the Related Art

Outboard motors can be used to propel watercraft. Outboard motors often have an engine disposed within a protective cowling. Protective cowlings typically include a top cowling member and a bottom cowling member. One or more air inlet openings are typically formed at the rear of the cowling to allow air to flow through the cowling and to an air intake system of the engine to be used in the combustion process. The air inlet openings are typically positioned at the rear end of the cowling because spray splashed up from waves normally does not flow through these air inlet openings when the watercraft moves in the forward direction.

Unfortunately, water can enter an internal cavity of the cowling if water approaches the cowling from behind. For example, waves or spray can enter air inlet openings in the cowling while the outboard is decelerated, or the watercraft moves backward. As such, an outboard motor may often incorporate a water separating structure. Japanese Patent Application HEI 01-273789 discloses a top cowling member that has air inlet openings on both front and rear sides. Water can enter through these air inlet openings. A complicated internal water separating structure can prevent the water from entering the air intake system. These complicated water separation structures can be difficult to manufacture and increase the overall complexity of the outboard motor.

Some outboard motors have front and rear intake chambers that communicate with each other. The capacity of these intake chambers is often low. In addition, each intake chamber has a complicated configuration due to a complex water separating structure. Water that has entered the intake chambers is not smoothly discharged from the outboard motor by these water separation structures. Unfortunately, large waves can surge over the cowling so that a large quantity of water enters the intake chambers. Since the large quantity of water is not smoothly and quickly discharged, the engine can suck the water in through its intake ports which can adversely affect engine performance.

Japanese Patent Application HEI 11-34984 discloses an outboard motor that has an intake chamber including a water separating structure. If large waves surge over the outboard motor, water can enter the intake chamber through the air inlet openings. The water also may remain trapped in the internal cavity. This trapped water can be sucked in through an air intake duct and ultimately into an engine compartment in the cavity from the intake chamber. Accordingly, water can be drawn into the engine's air intake system.

SUMMARY OF THE INVENTION

An aspect of the present invention disclosed herein includes the realization that an outboard motor having an improved water separating structure can smoothly discharge water even if a large quantity of the water enters an air intake chamber.

In some aspects of the present invention, an outboard motor comprises a cowling that generally encloses an engine. A pair of air inlet openings in the cowling provides air flow through the cowling. The cowling comprises a guide member that defines an air intake chamber that communicates with the air inlet openings and comprises an air intake duct. The cowling and guide member are configured such that air drawn through the air inlet openings flows into the air intake chamber and then through the air intake duct to an engine compartment defined within the cowling. The engine compartment is sized to accommodate the engine. A baffle defines at least a portion of the air intake chamber. The baffle has a central portion and opposing first and second side portions extending laterally and forwardly from the central portion. The air intake duct is positioned between the baffle and a rear wall of the cowling. A first one of the air inlet openings extends rearwardly from the first side portion of the baffle and a second one of the air inlet openings extends rearwardly from the second side portion.

In yet other aspects of the present invention, an outboard motor comprises an internal combustion engine and a cowling. The cowling defines an engine compartment in which the engine is disposed. The cowling comprises air intake means for directing air from outside the cowling into the engine compartment for combustion in the engine. The air intake means comprises an air intake duct and baffling means for changing the direction of air flow through the air intakes means so as to remove water from the air flow, and means for directing a flow of water within the air intake means away from the air intake duct and out of the air intake means so that water flows readily out of the air intake means.

BRIEF DESCRIPTION OF THE DRAWINGS

The above-mentioned and other features of the invention disclosed herein are described below with reference to the drawings of preferred embodiments. The illustrated embodiments are intended to illustrate, but not to limit the invention. The drawings comprise six figures.

DETAILED DESCRIPTION OF THE PREFERRED EMBODIMENT

Figure 1:
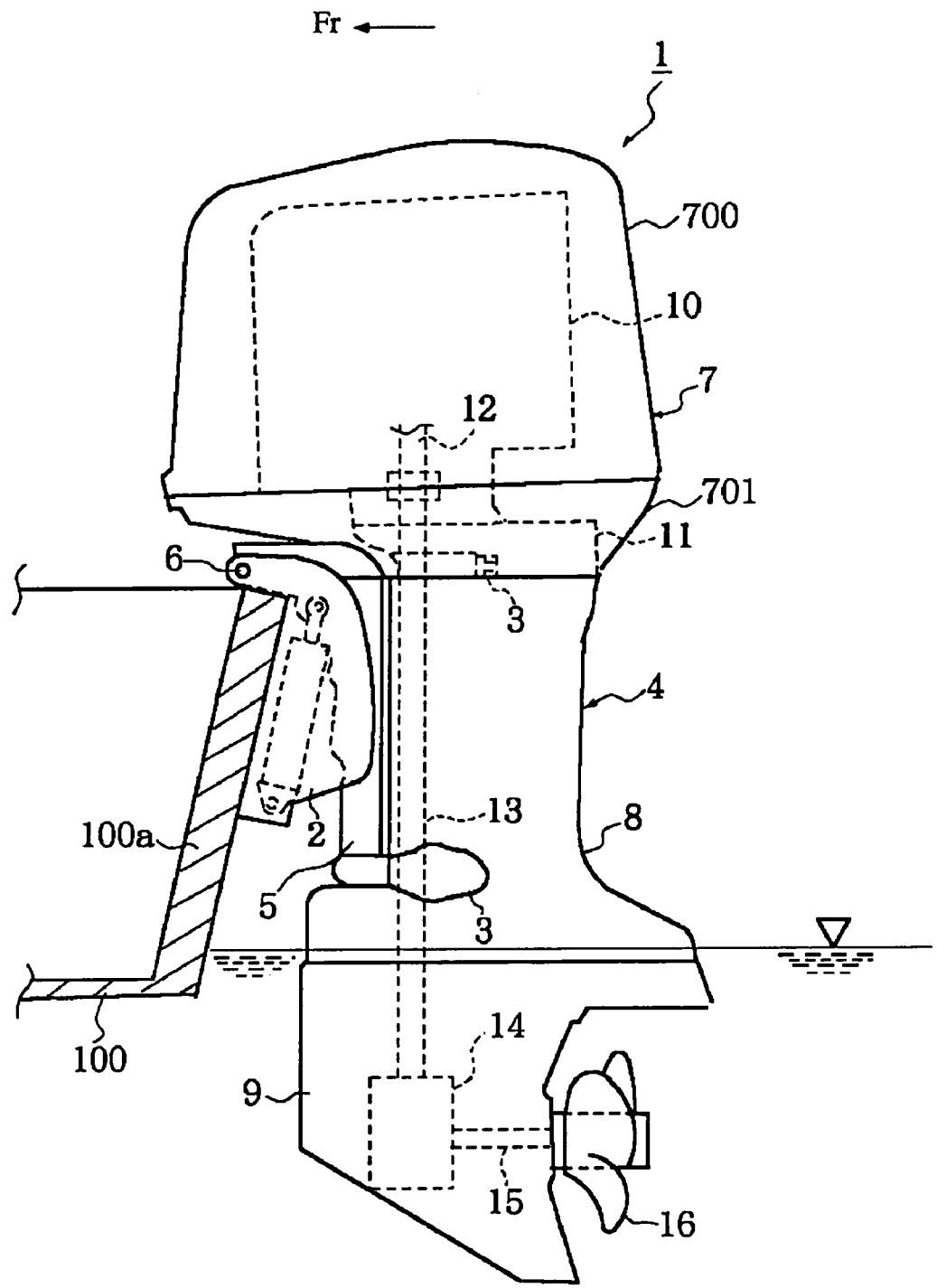
FIG. 1 is a side view of a watercraft having an outboard motor in accordance with a preferred embodiment of the present invention. An associated watercraft, on which the outboard motor is mounted, is partially shown in section. Several of the internal components of the outboard motor are illustrated in phantom.
Figure 3:
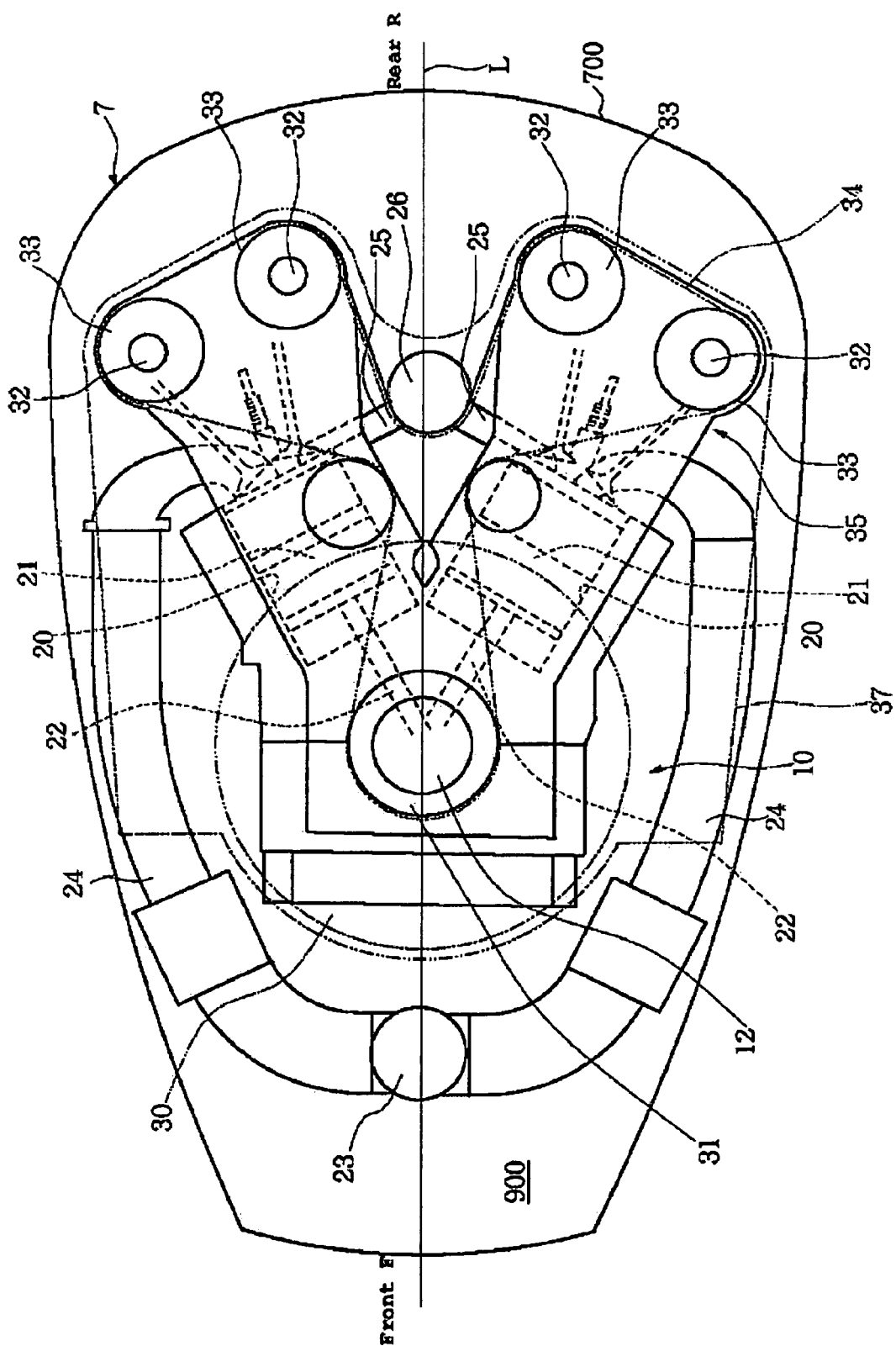
FIG. 3 is a top plan of the engine of the outboard motor of FIG. 1.

With reference to FIG. 1, a watercraft has an outboard motor 1 that is configured in accordance with certain features, aspects, and advantages of the present invention. The outboard motor 1 is a typical marine drive, and thus all the embodiments below are described in the context of an outboard motor. The embodiments, however, can be applied to other marine drives, as will become apparent to those of ordinary skill in the art. The arrow FR in the drawing indicates the forward direction in which the watercraft travels. As shown in FIG. 3, a longitudinal centerline L indicates a fore to aft direction of the outboard motor. The reference symbol F indicates the front side, while the reference symbol R indicates the rear side. It will be appreciated, however, that the illustrated embodiments can be located or oriented in a variety of desired positions.

The illustrated watercraft of FIG. 1 has a hull 100 floating in the water. The hull 100 carries the outboard motor 1, which has a propulsion unit 4 and an internal combustion engine 10 (shown in phantom). The engine 10 of the outboard motor 1 powers the propulsion unit 4 which propels the watercraft. The illustrated propulsion unit 4 is a single propeller system; however, other types of propulsion units can be used as well, such as, for example, a dual counter-rotational propeller system, a jet drive, and the like. The outboard motor 1 is supported on the transom 100a of the hull 100 by a clamp bracket 2 so as to place at least a portion of the propulsion unit 4 in a submerged position when the watercraft rests in the water.

A swivel bracket 5 is coupled to the clamping bracket 2 for pivotal movement in a vertical direction about an axis defined by a tilt shaft 6. The swivel bracket 5 has upper and lower damper members 3 for supporting the propulsion unit 4. The outboard motor 1 is preferably steerable and/or tiltable by moving the clamps 4, 5.

With continued reference to FIG. 1, the propulsion unit 4 has a protective housing that surrounds the internal components of the engine 10. The housing can include a cowling 7, an upper casing 8, and a lower casing 9. The cowling 7 preferably includes a top cowling member 700 and a bottom cowling member 701. The cowling 7 can enclose and protect the engine 10. The top cowling member 700 can be removed from the bottom cowling member 701 so as to expose the engine 10. Various types of attachment means can be used to couple the top cowling member 700 to the bottom cowling member 701.

An exhaust guide 11 can be disposed within the housing. In the illustrated embodiment, the exhaust guide 11 supports the engine 10 and is surrounded by the bottom cowling member 701. The upper casing 8 can be mounted to the exhaust guide 11. The illustrated upper casing 8 extends downwardly from the exhaust guide 11.

The engine 10 has a vertically extending crankshaft 12. A driveshaft 13 extends vertically through the upper casing 8. A top end of the driveshaft 13 is coupled to a bottom end of the crankshaft 12. A bottom end of the driveshaft 13 is coupled to a drive mechanism 14. The illustrated drive mechanism 14 is in the form of a forward and reverse switching mechanism 14 housed within the lower casing 9.

A propeller shaft 15 extends generally horizontally from the forward and reverse switching mechanism 14. A rear end of the propeller shaft 15 extends outwardly from the lower casing 9. A single propeller 16 is fixed to the rear end of the propeller shaft 15. Of course, dual counter-rotational propeller systems or other types of systems can be used to propel the watercraft.

Figure 2:
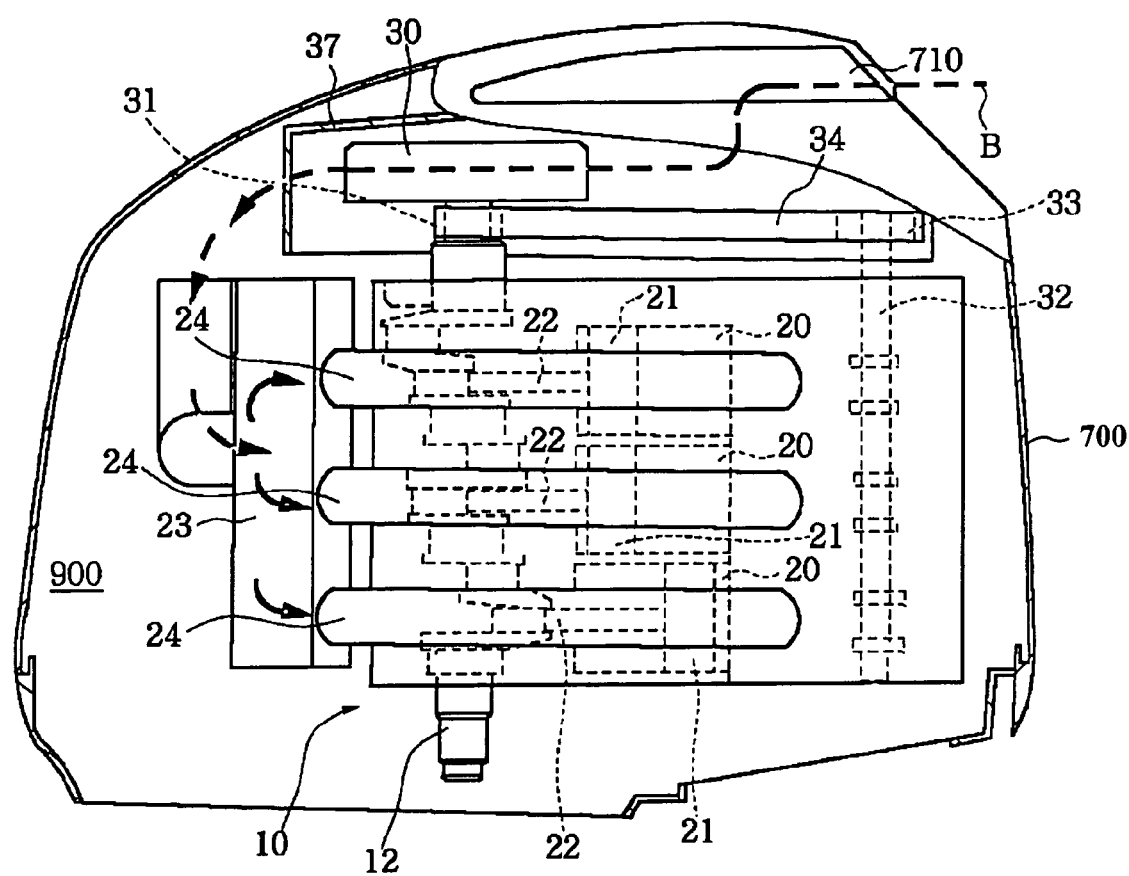
FIG. 2 is a longitudinal cross-sectional view of an engine of the outboard motor of FIG. 1. Several of the internal components of the engine are illustrated in phantom.

With reference to FIGS. 1 through 3, the illustrated outboard motor 1 includes the internal combustion engine 10 which is preferably a multi-cylinder, four-cycle engine. Engines having a different number of cylinders, other cylinder arrangements, various cylinder orientations (e.g., upright cylinder banks, and V-type), and operating on various combustion principles (e.g., four stroke, crankcase compression two-stroke, diesel, and rotary) are all practicable for use with the cowlings disclosed herein. The engine can comprise an engine body defining at least one cylinder bore therethrough. A cylinder head assembly is connected to the cylinder bore, and a piston is disposed within the cylinder bore. The cylinder bore, the cylinder head assembly, and the piston cooperate to define a variable combustion chamber.

The illustrated engine 10 disposed within the cowling 7 is a four cycle, V-type, six cylinder engine. The engine 10 comprises four in-line cylinder chambers that extend generally horizontally and are generally vertically spaced above one another. Two banks of the engine 10 are arranged to form a V-shape, as illustrated in FIG. 3. Each bank has three cylinder bores 20 extending generally horizontally, as illustrated in FIG. 2. The cylinder bores 20 are vertically spaced from each other. A piston 21 is reciprocally disposed within each cylinder 20 to define a variable combustion chamber. The end of the connecting rods 22 are coupled to corresponding pistons 21 while the other ends of the connecting rods 22 are coupled to the crankshaft 12. In such an arrangement, the connecting rod 22 and associated crankshaft 12 are rotated when the pistons 21 are reciprocated.

With reference to FIG. 3, an intake silencer 23 is disposed in front of the engine 10. Intake conduits 24 are coupled to either side of the intake silencer 23. The intake conduits 24 are also connected to the respective engine combustion chambers. Exhaust conduits 25 are connected to the combustion chambers and an exhaust manifold 26. The exhaust manifold 26 extends vertically in a space defined by both of the engine banks, and discharges the exhaust gases through the exhaust guide 11 and ultimately into the water.

With continued reference to FIGS. 1 to 3, a generator 30 is disposed at a top end of the crankshaft 12. The top end of the crankshaft 12 also has a drive pulley 31. A valve drive mechanism 35 can open and close valves of the engine 10. Each bank of the engine 10 has a pair of camshafts 32, and a top end of each camshaft 32 has a driven pulley 33. A timing belt 34 is wound around the drive and driven pulleys 31, 33. An engine cover 37 preferably covers the valve drive mechanism 35 and the generator 30. Other types of engine configurations are also possible.

Figure 4:
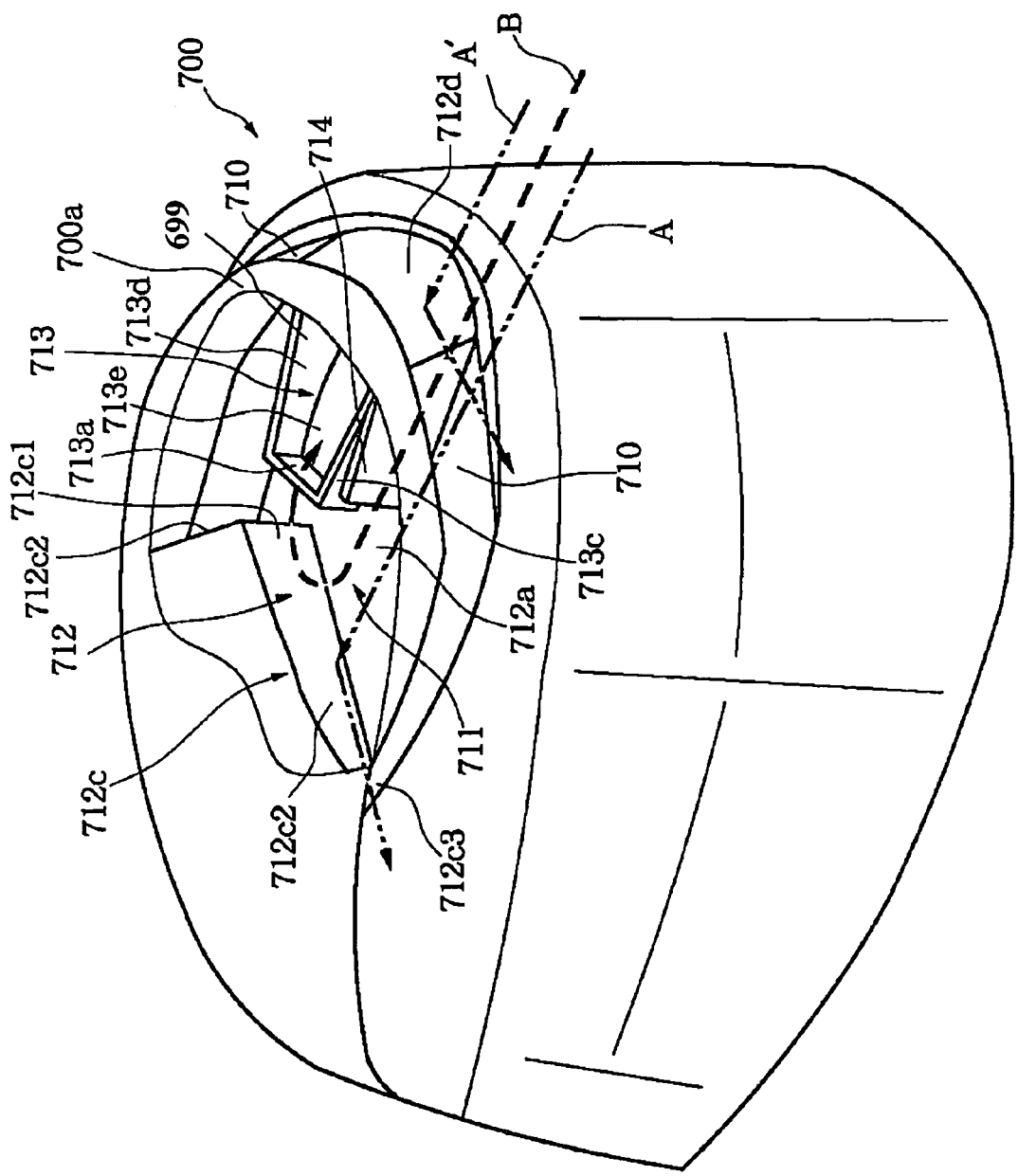
FIG. 4 is a perspective view of a top cowling member of the outboard motor of FIG. 1.
Figure 5:
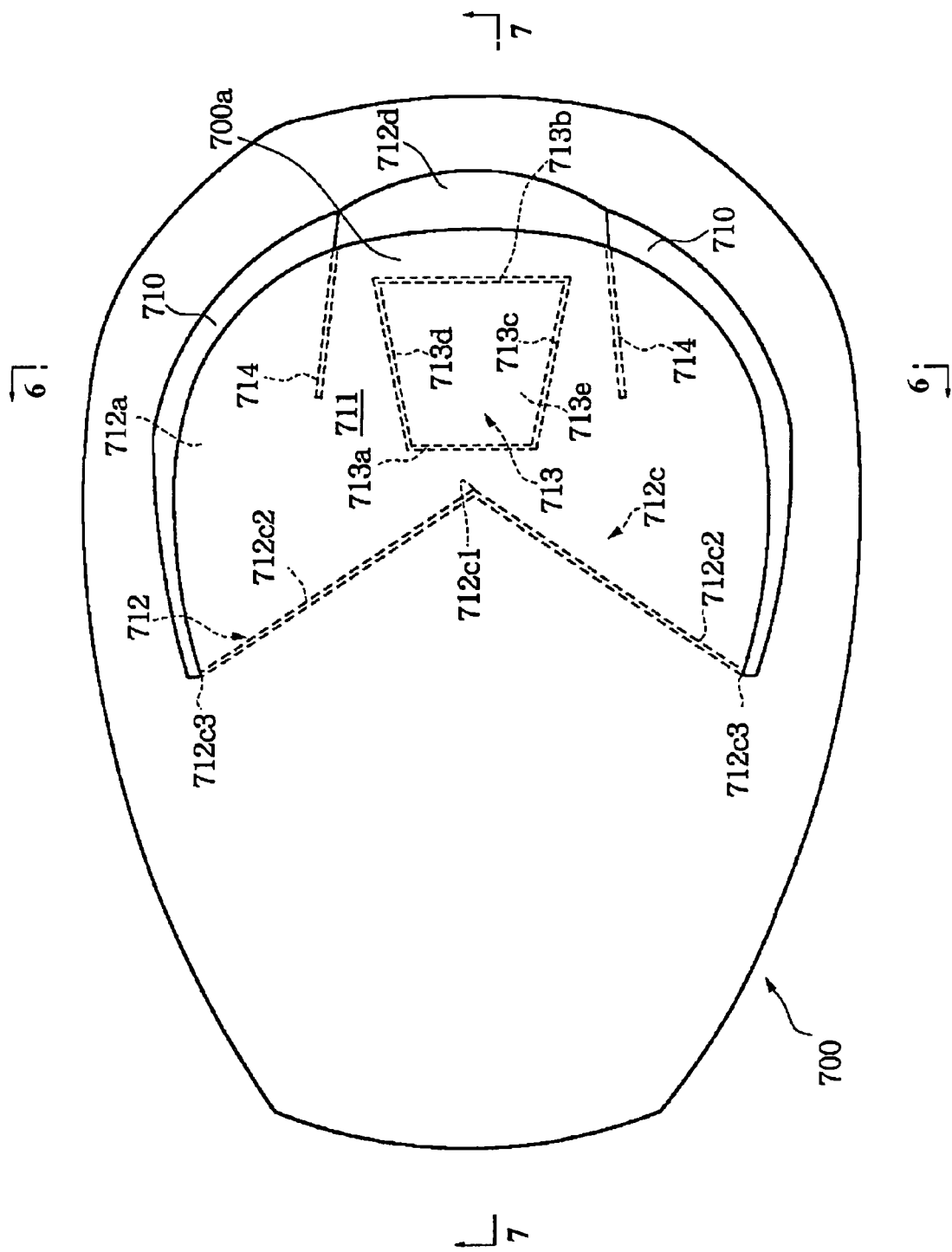
FIG. 5 is a top plan view of the top cowling member. Several of the internal components of the top cowling member are illustrated in phantom.

With reference to FIGS. 2, 4, and 5, the top cowling member 700 can be used to deliver air to the engine 10. In some embodiments, the top cowling member 700 of the cowling 7 can have one or more inlet openings. Air that flows through the air inlet openings can ultimately be delivered to the air silencer 23 and then the combustion chambers of the engine 10.

The illustrated top cowling member 700 includes a pair of air inlet openings 710 and an air intake chamber 711. The air intake chamber 711 can be a space connecting the air inlet openings 710 and an air intake duct 713 for introducing outside air into an engine compartment 900. The air drawn through the air inlet openings 710 is introduced into the engine from the air intake chamber 711 through the air intake duct 713.

Figure 6:
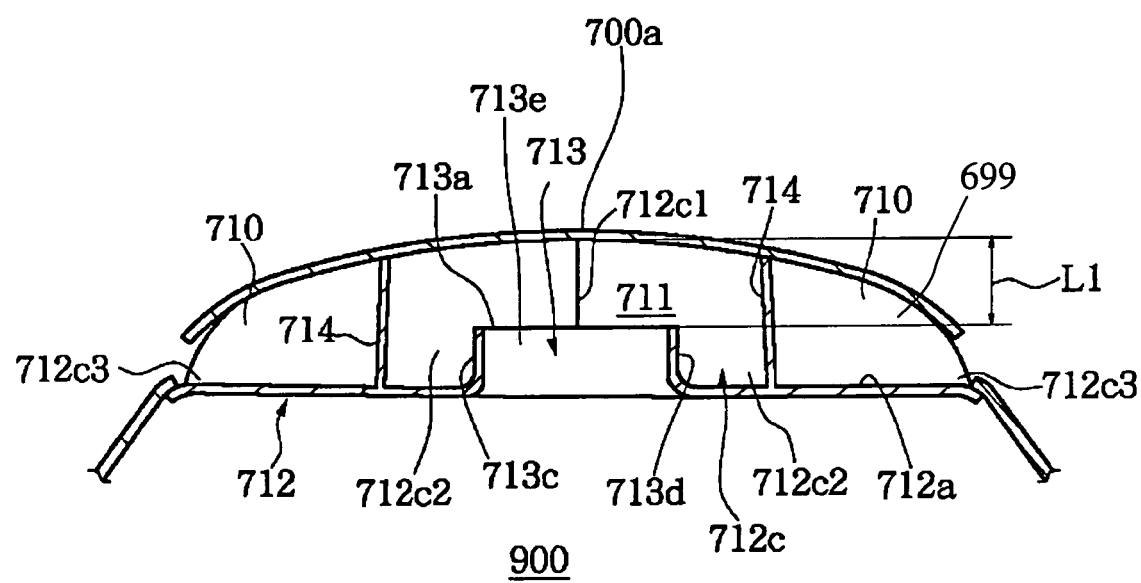
FIG. 6 is a cross-sectional view of the cowling member taken along the line 6—6 of FIG. 5.
Figure 7:
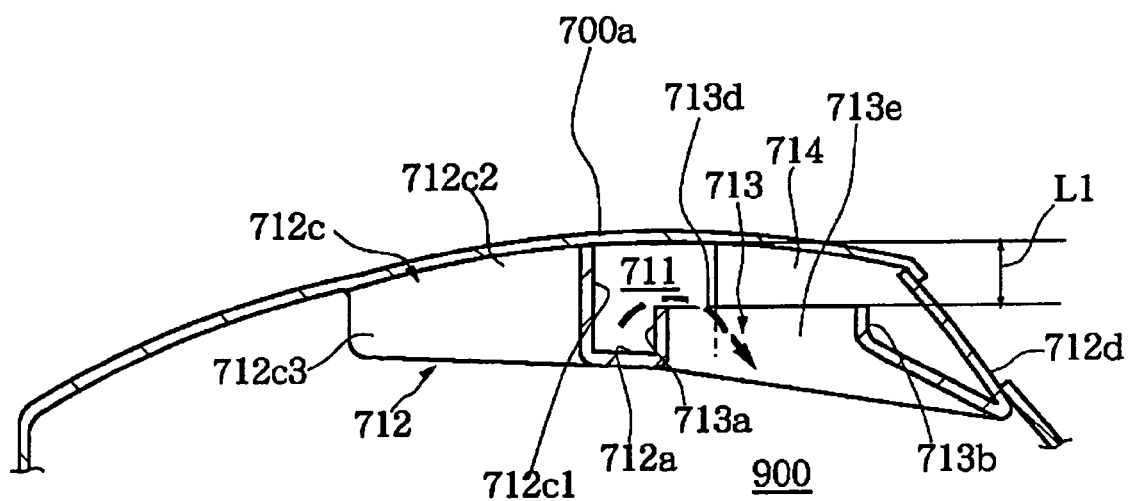
FIG. 7 is a cross-sectional view of the cowling member taken along the line 7—7 of FIG. 5.

With reference to FIGS. 4 to 6, a water separating structure 699 can be formed by a guide member 712 and the cowling 700. The water separating structure 699 can minimize the amount of water that enters the engine compartment 900. The guide member 712 can define the air intake duct 713. The illustrated guide member 712 includes the vertically extending air intake duct 713 that defines a flow path through the guide member 712. The illustrated air intake duct 713 extends from a center portion of a bottom wall 712a, although the air intake duct 713 can be at other locations.

The guide member 712 also has a front wall 712c extending vertically from a front portion of the bottom wall 712a and a rear wall 712d extending from a rear portion of the bottom wall 712a. As such, the front wall 712c and the rear wall 712d are positioned at opposing ends of the air intake chamber 711. The rear wall 712d preferably defines an outer surface of the cowling. In some embodiments, the rear wall 712d extends laterally between at least two inlet openings 710. In the illustrated embodiment of FIGS. 4 and 5, the rear wall 712d forms a wall extending between the right and left air inlet openings 710.

The front wall 712c has a center portion 712c1 and the side portions 712c2. The illustrated front wall 712c can have a center portion 712c1 that is positioned rearwardly of the side portions 712c2 of the front wall 712c. The side portions 712c2 are angled to each other. Both side portions 712c2 extend obliquely forward towards the sides of the top cowling member 700. The illustrated side portions 712c2 extend from the center portion 712c1 to the openings 710 and preferably form tapered surfaces 712c2. The front wall 712c can extend rearward to the center portion 712c1 to generally form a generally V-shaped wall as viewed from above. In the illustrated embodiment, the side portions 712c2 are somewhat flat. However, the side portions 712c2 can be curved or have any suitable configuration for directing fluid flow as desired. The angle defined between the side portions 712c2 can be any suitable angle such the side portions 712c2 can effectively direct water flow out of the openings 710.

To assemble the guide member 712 and the cowling upper section 700a, the guide member 712 can be inserted through a bottom end of the top cowling member 700. The guide member 712 can then be coupled to an inner circumferential portion of the cowling upper section 700a. Adhesives, mechanical fasteners (e.g., nut and bolt assemblies), rivets, fasteners, welding, or other suitable coupling means can be used to attach the guide member 712 to the cowling upper section 700a. The guide member 712 and the cowling upper section 700a can cooperate to form the chamber 711 connecting the air inlet openings 710 and the air intake duct 713. In some embodiments, the guide member 712 can be integrally formed with the cowling upper section 700a. For example, the guide member 712 and the upper cowling section 700a can be formed through a molding process machining process, stamping process, and combinations thereof. Thus, the guide member 712 and the cowling upper section 700a can have a one-piece or multi-piece construction.

At least a portion of the air intake duct 713 preferably is positioned rearwardly of the front wall 712c. In the illustrated embodiment, the air intake duct 713 defines a passageway that extends downwardly and is positioned rearwardly of the front wall 712c. In some embodiments, the air intake duct 713 is interposed between the front wall 712c and the rear wall 712d. Preferably, a substantial portion of the air intake duct 713 is positioned between the front wall 712c and the rear wall 712d. The front wall 712c can be a baffle for directing water flow.

In some embodiments, the intake duct 713 includes a front wall section 713a extending upwardly from the bottom wall 712a. A rear wall section 713b is spaced from the front wall section 713a. In the illustrated embodiment of FIG. 5, the rear wall section 713b is longer than the front wall section 713a as viewed from above. Right and left side wall sections 713c, 713d extend between and connect the front wall section 713a and the rear wall section 713b. The front wall section 713a, the rear wall section 713b, and the right and left side wall sections 713c, 713d together define an intake opening 713e. As illustrated in FIG. 5, the intake duct 713 is somewhat trapezoidal in shape. However, the intake duct 713 can have other shapes, including, but not limited to, circular, elliptical, polygonal (including rounded polygonal), and the like. The intake duct 713 extends generally vertically when the outboard motor 1 occupies a generally vertical orientation, as shown in FIG. 1.

With reference to FIG. 6, a gap can be defined between a top end of the intake opening 713e and an inner surface of the cowling upper section 700a. Thus, the intake duct 713 is separated from the top of the cowling upper section 700a. The length L1 can be selected to achieve the desired air flow through the air intake duct 713 while minimizing water flow through the air intake duct 713. For example, the length L1 can be increased to increase air flow rates through the duct 713. However, such a duct 713 may also allow an increased amount of water to pass therethrough. Air in the air intake chamber 711 can flow through the air intake duct 713 to the engine 10 disposed beneath the guide member 712. The air intake duct 713 is located generally at the center of the air intake chamber 711, although the air duct 713 can be at other locations based on the desired air flow and engine configuration.

The rear wall 712d of the guide member 712 can extend horizontally between the inlet openings 710. As such, the rear wall 712d separates the air inlet openings 710 from each other. The right and left air inlet openings 710 extend to right and left side ends 712c3 of the front wall 712c of the air intake chamber 711. As illustrated in FIG. 2, the openings 710 can be elongated slots formed in the upper cowling section 700a. The elongated openings 710 can be tapered in the forward direction. Alternatively, the openings can have a substantially uniform height with along their lengths. Preferably, the openings terminate at some point along the central section of the cowling 700a. The configuration of the openings can be selected based on the configuration of the guide member 712.

The guide member 712 can also have one or more partitions for affecting fluid flow (e.g., air flow, water flow, etc.) through the chamber 711. The illustrated guide member 712 has a pair of partitions 714 extending in the fore to aft direction. At least a portion of the air intake duct 713 is interposed between the partitions 714. In some embodiments, a substantial portion of the air intake duct 713 is positioned between the partitions 714. The partitions 714 can be walls or other structure that effectively directs fluid flow. Each partition 714 preferably extends vertically between the bottom wall 712a and the inner surface of the cowling upper section 700a, as shown in FIG. 6. The partitions 714 are preferably spaced from the air intake duct 713 to further reduce water flow into the duct 713, as detailed below. In additional embodiments, the partitions are angled to each other. In some embodiments, the partitions are angled downwardly and outwardly towards the sides of the cowling. In some embodiments, including the illustrated embodiments, the partitions 714 are positioned on opposite sides of the longitudinal centerline L and diverge from the rear to the forward direction.

The illustrated partitions 714 extend forwardly from right and left ends of the rear wall 712d of the guide member 712. The air intake duct 713 is generally positioned midway between the partitions 714. In addition, because the air intake duct 713 is positioned generally at the center of the air intake chamber 711, the water entering the air intake chamber 711 from the rear of the outboard motor 1 can be easily discharged to right and left locations.

In some circumstances, water can enter the air intake chamber 711. If waves surge over the cowling, from behind the watercraft, especially while the watercraft is decelerated or the watercraft moves backward, for example, water may enter the intake chamber 711 via the inlet openings 710. In some embodiments, including the illustrated embodiment of FIG. 4, the water flows through the outboard motor 1 along a path A. Water that flows through the openings 710 is guided by the partitions 714 towards the front wall 712c. The partitions 114 keep the water away from the air intake duct 713. The front wall 712c redirects the water flow laterally such that the water flows out of the forward ends of the openings 710 without substantial resistance. Preferably, the water flows against the side portions 712c2 which direct the flow of water outwardly. As such, the guide member 712 effectively discharges water outside of the outboard motor 1. To reduce the amount of water that enters the air intake duct 713, the water preferably flows smoothly through the chamber 711.

As thus described, the front wall 712c of the air intake chamber 711 forms a generally V-shape wall and has tapered surfaces 712c2. Because of this construction, when water enters the air intake chamber 711 through the right and left air inlet openings 710, the water impinges the tapered surfaces 712c2 of the front wall 712c and then flows along the tapered surfaces 712c2. The water can continuously flow along the surfaces 712c2 until it flows out of a corresponding opening 710. The water thus goes out of the outboard motor 1 through the air inlet openings 710 without greatly changing its flow direction. Thus, even if a large quantity of water enters the air intake chamber 711, it can be smoothly discharged.

The rear wall 712d also helps minimize water that flows through the chamber 711 into the air intake duct 713. As illustrated in FIG. 4, water can flow along a path A' such that water is deflected by the rear wall 712d. In some embodiments, the partitions 714 and the rear wall 712d form a generally U-shaped wall. However, the partitions 714 and the rear wall 712d can also have other shapes.

If waves flow onto the cowling from an obliquely rear location, water may flow through the openings 710. The partitions 714 can effectively block the water from entering the air intake duct 713. If the outboard motor acts as a rudder while the watercraft moves backward, for example, the partitions 714 can effectively block the forwardly moving water that may enter the cowling 7 that would otherwise enter the air intake duct 713 from the obliquely rear location. Accordingly, the partitions 714 can effectively reduce or minimize water that enters the intake duct 713 even when the water enters from various locations. Even though water does not flow into the air intake duct 713, air can flow through the duct 713. Accordingly, air can flow through the air intake duct 713 while water is directed away from the air intake duct 713.

The air can be introduced into the engine through the intake air duct 713 along a path B. As illustrated in FIG. 4, the air can flow through the openings 710 into the air intake chamber 711. The air is then drawn around the partitions 114 into the air intake duct 713. The air then flows downwardly through the air intake duct 713 into the engine compartment 900. The air in the engine compartment 900 can be used by the engine 10 for the combustion process. During engine operation, air can be continuously delivered to the engine 10 while water is inhibited from entering the air intake duct 713.

Figure 8:
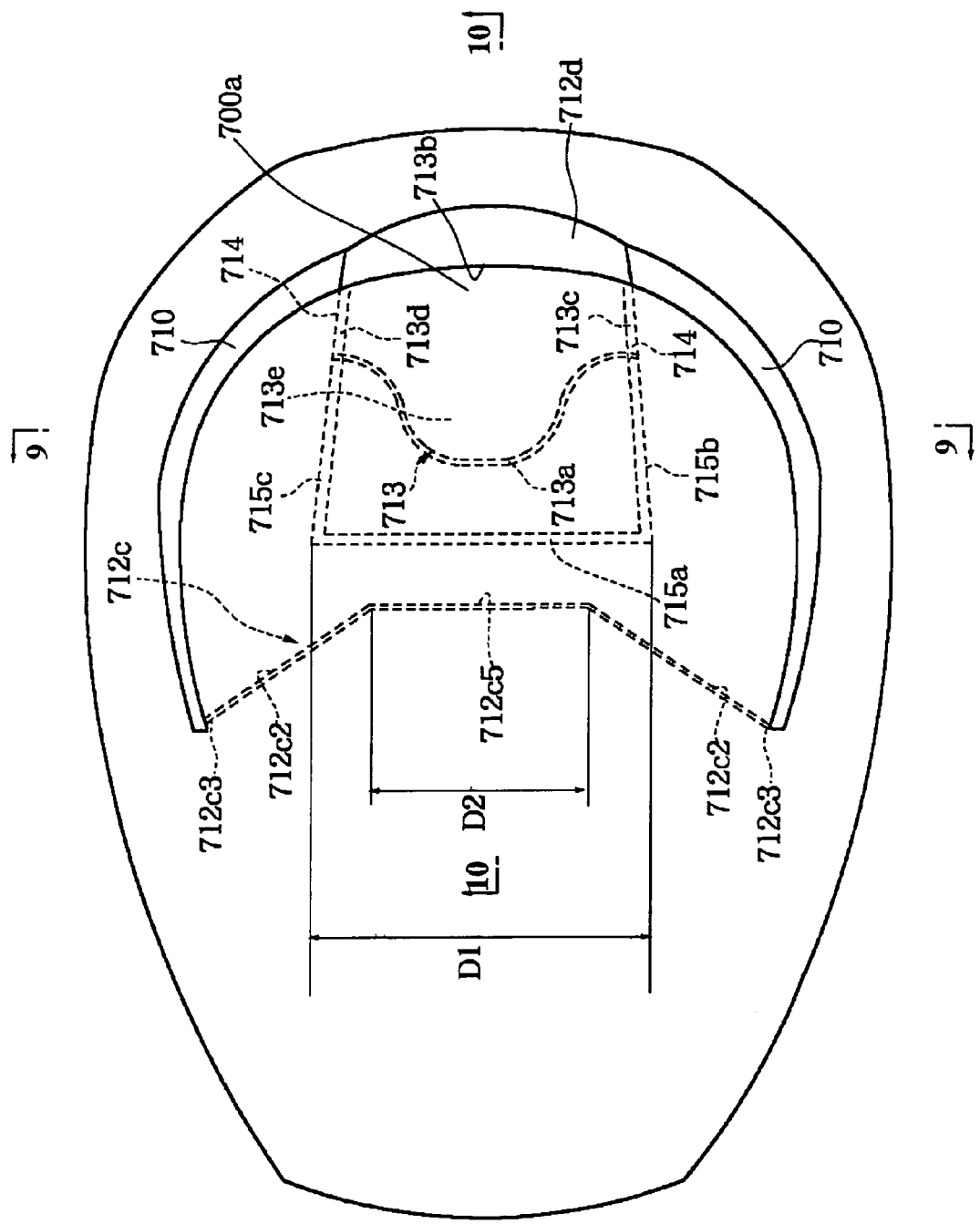
FIG. 8 is a top plan view of a top cowling member in accordance with another embodiment.
Figure 9:
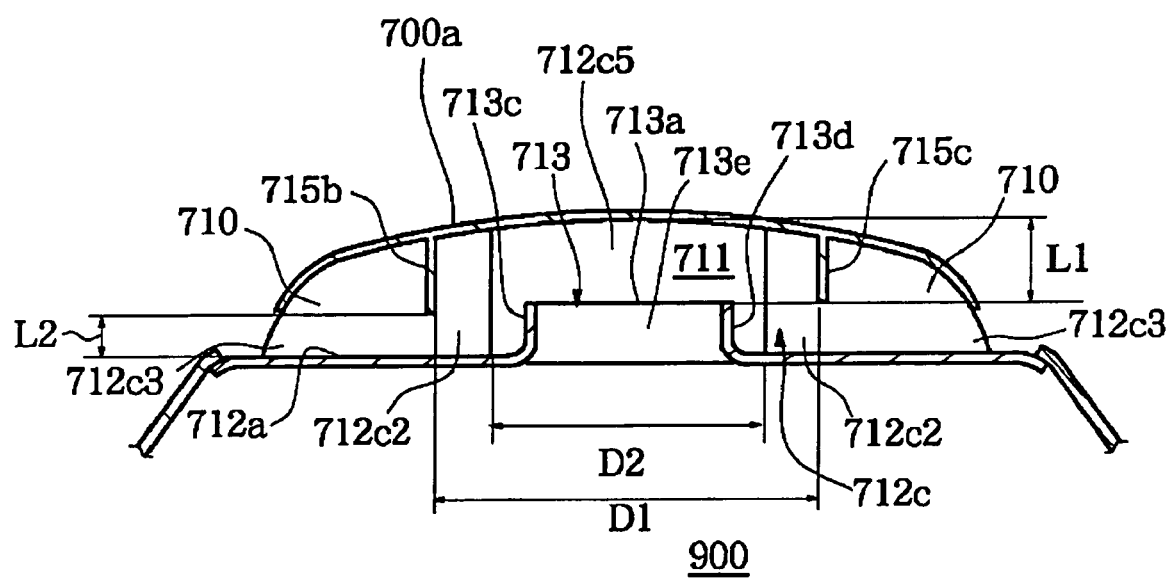
FIG. 9 is a cross-sectional view of the cowling member taken along the line 9—9 of FIG. 8.
Figure 10:
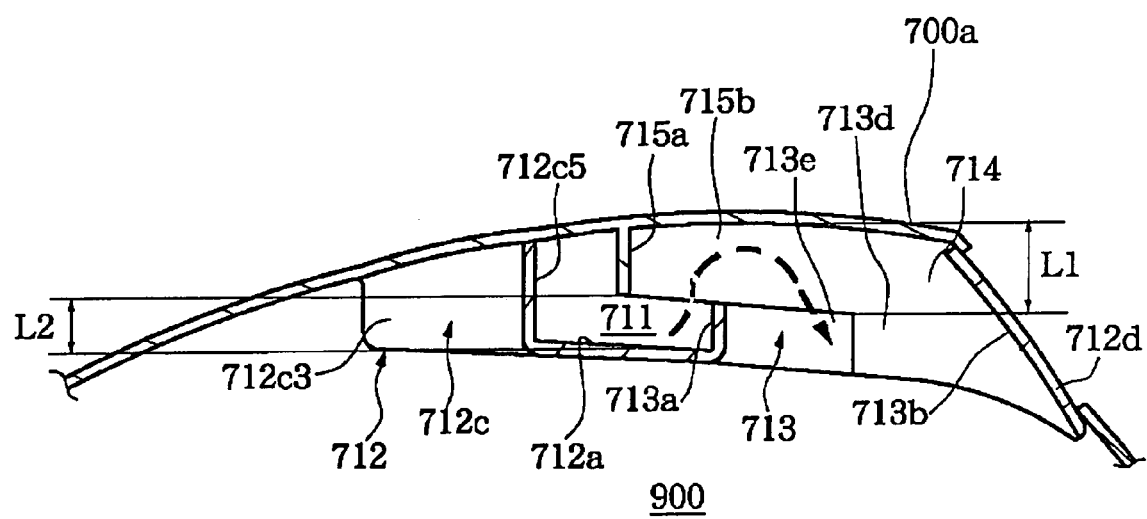
FIG. 10 is a cross-sectional view of the cowling member taken along the line 10—10 of FIG. 8.

FIGS. 8 through 10 illustrate another embodiment of an outboard motor that is generally similar to the outboard motor described above, except as detailed below. A front wall 712c of the air intake chamber 711 is a baffle to redirect water flow, if water enters the cowling. The illustrated front wall 712c includes a center portion 712c5 and the laterally extending tapered surfaces 712c2. The center portion 712c5 is interposed between the surfaces 712c2 and is generally flat as viewed from above, although the center portion 712c5 can also be curved or have another configuration, if desired. As illustrated in FIG. 8, the front wall 712c can have a somewhat trapezoidal shape. The side surfaces 712c2 are angled to the center portion 712c5.

With continued reference to FIG. 8, a width D2 of the center portion 712c5 in the transverse direction is preferably less than a distance D1 between front ends of the right and left partitions 714. As discussed above, if waves surge on the cowling from an obliquely rear location while the outboard motor 1 is steered and the watercraft moves backward, water may enter the cowling 7 through the openings 710. However, the water that would otherwise enter the air intake duct 713 from the obliquely rear location can be blocked by the partitions 714. A portion of the water can go to the other side of the outboard motor 1 through the air intake chamber 711 because of the front wall 712c. The front wall 712c directs the water flow outwardly towards the openings 710. Accordingly, the water is effectively prevented from entering the air intake duct 713.

The air intake duct 713 includes a front wall section 713a extending upward from the bottom wall 712a, a rear wall section 713b, and right and left side wall sections 713c, 713d. The right and left side wall sections 713c, 713d can connect the front wall section 713a and the rear wall section 713b. The front wall section 713a can protrude forwardly. The illustrated front wall section 713a is convex in the forward direction so that the air can be smoothly drawn into the air intake duct 713. As illustrated in FIG. 8, the front wall section 713a is somewhat U-shaped, although the front wall section 713a can have other configurations.

A rear wall 712d can be spaced rearwardly of the front wall 713a. The illustrated rear wall 712d is interposed between the right and left air inlet openings 710. The rear wall 712d can also form a rear wall section 713b of the air intake duct 713. Thus, the inner surface of rear wall 712d can form at least a portion of the flow passageway extending through the air intake duct 713. If water splashes over the outboard motor 1 from behind, the water can flow through the air inlet openings 710. The water can then proceed through the chamber 711 towards the front wall 712. The water may impinge the rear wall 712d. The rear wall 712d can deflect the water so that water does not enter the cowling 7. Consequently, the rear wall 712d can minimize or reduce the amount of water that enters the intake duct 713. The water is therefore effectively inhibited from entering the air intake duct 713 from the rearward direction.

The right and left side walls 713c, 713d of the air intake duct 713 can also form partitions 714 extending on both sides of the air intake duct 713 in the general fore to aft direction. The partitions 714 can be coupled with the bottom wall 712a and the inner surface of the cowling upper section 700a. As illustrated in FIG. 10, a gap L1 can be defined between a top end of the intake opening 713e of the intake duct 713 and the lower inner surface of the cowling upper section 700a. The air intake duct 713 is configured to guide the air (shown as a dashed line) towards the engine from the air intake chamber 711.

The cowling upper section 700a can have one or more vertically extending walls to further minimize water flow into the air intake duct 713. The cowling upper section 700a has a front downward wall 715a and right and left downward walls 715b, 715c. Each of these walls 715a, 715b, and 715c can extend vertically downward from the inner surface of the cowling upper section 700a, as illustrated in FIGS. 9 and 10. The right and left downward walls 715b, 715c can also be connected to the partitions 714, if desired. Thus, the partitions 714 can extend generally in the fore to aft direction and can connect the rear wall 712d to the right and left downward walls 715b, 715c. The walls 715b, 715c can extend forwardly past the air intake duct 713. The wall 715a extends laterally and can be spaced forwardly from the air intake duct 713.

A gap L2 can be defined between the bottom wall 712a and one or more of the front downward wall 715a and the right and left downward walls 715b, 715c. As such, air can reach the air intake duct 713 through the gap L2. In some embodiments, including the illustrated embodiment of FIG. 9, the lower ends of the downward walls 715a, 715b, 715c are positioned lower than the upper end of the air intake duct 713. The walls 715a, 715b, 715c can effectively prevent water from entering into the air intake duct 713. In some embodiments, the lower ends of the downward walls 715a, 715b, 715c are generally vertically even with the upper end of the air intake duct 713. In some embodiments, the lower ends of the downward walls 715a, 715b, 715c are positioned higher than the upper end of the air intake duct 713. The right and left downward walls 715b, 715c are preferably spaced laterally from the air intake duct 713.

If water passes through the openings 710, the right and left downward walls 715b, 715c can direct the water towards the side portions 712c2. The water can proceed through the chamber 711 until it flows against the side portions 712c2. The side portions 712c2 can direct the water laterally towards one of the openings 710 to discharge the water from the outboard motor 1. In this manner, water entering the air intake chamber 711 through an air inlet opening 710 can flow smoothly along the intake chamber 711 and can flow smoothly flow out of the chamber 711 without greatly changing its flow direction. However, air is permitted to simultaneously flow through the air inlet openings 710 and into the air intake duct 713 for the combustion process.

A skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. For example, the systems described above can be used with other types of marine drives (i.e., inboard motors, inboard/outboard motors, jet drives, etc.) and also certain land vehicles. Accordingly, it is not intended that the invention be limited, except as by the appended claims.

What is claimed is:

1. An outboard motor comprising a cowling generally enclosing an engine, a pair of air inlet openings in the cowling for air flow through the cowling, the cowling comprising a guide member defining an air intake chamber communicating with the air inlet openings and comprising an air intake duct, the cowling and guide member configured such that air drawn through the air inlet openings flows into the air intake chamber and then through the air intake duct to an engine compartment defined within the cowling, the engine compartment being sized to accommodate the engine, a baffle defining at least a portion of the air intake chamber, the baffle having a central portion and opposing first and second side portions extending laterally and forwardly from the central portion, the air intake duct being positioned between the baffle and a rear wall of the cowling, a first one of the air inlet openings extending rearwardly from the first side portion of the baffle and a second one of the air inlet openings extending rearwardly from the second side portion.

2. The outboard motor of claim 1, wherein the rear wall forms a rear wall portion of the air intake duct.

3. The outboard motor of claim 2, wherein the first and the second air inlet openings each extend from a respective side portion to the rear wall.

4. The outboard motor of claim 1, wherein the cowling comprises first and second partitions extending generally in a fore to aft direction, and at least a portion of the air intake duct is interposed between the first and second partitions.

5. The outboard motor of claim 4, wherein the baffle has a generally flat center portion, and a width of the generally flat center portion in the transverse direction is less than a distance between front ends of the first and second partitions.

6. The outboard motor of claim 4, wherein the first and second partitions comprises generally vertical walls arranged generally between the air inlet openings and the air intake duct.

7. The outboard motor of claim 1, wherein a first partition extends forwardly from a first side of the rear wall and a second partition extends forwardly from a second side of the rear wall.

8. The outboard motor of claim 1, wherein the baffle is the front wall of the air intake chamber.

9. The outboard motor of claim 8, wherein the baffle is substantially V-shaped as viewed from above.

10. The outboard motor of claim 1, wherein the side portions are angled with respect to the central portion.

11. The outboard motor of claim 1, wherein the air intake duct extends vertically through a floor of the air chamber.

12. The outboard motor of claim 1, wherein the air intake duct is positioned generally at a center of the air intake chamber.

13. The outboard motor of claim 1, wherein the first and second partitions are positioned on opposite sides of a longitudinal centerline of the outboard motor and diverge from the rear to the forward direction.

14. An outboard motor comprising an internal combustion engine and a cowling, the cowling defining an engine compartment in which the engine is disposed, the cowling comprising air intake means for directing air from outside the cowling into the engine compartment for combustion in the engine, the air intake means comprising an air intake duct and baffling means for changing the direction of air flow through the air intake means so as to remove water from the air flow, and means for directing a flow of water within the air intake means away from the air intake duct and out of the air intake means so that water flows readily out of the air intake means, wherein water flowing into the air intake means from the rear is directed laterally out of the air intake means.

15. The outboard motor of claim 14, wherein the air intake means comprises openings through the cowling.

16. The outboard motor of claim 15, wherein the openings are formed along the sides of the cowling.

17. An outboard motor comprising an internal combustion engine and a cowling, the cowling defining an engine compartment in which the engine is disposed, the cowling comprising air intake means for directing air from outside the cowling into the engine compartment for combustion in the engine, the air intake means comprising an air intake duct and baffling means for changing the direction of air flow through the air intake means so as to remove water from the air flow, and means for directing a flow of water within the air intake means away from the air intake duct and out of the air intake means so that water flows readily out of the air intake means, wherein the means for directing the flow of water comprises a wall that is in fluid communication with one or more air inlet openings extending through the cowling.

18. An outboard motor comprising an internal combustion engine and a cowling, the cowling defining an engine compartment in which the engine is disposed, the cowling comprising air intake means for directing air from outside the cowling into the engine compartment for combustion in the engine, the air intake means comprising an air intake duct and baffling means for changing the direction of air flow through the air intake means so as to remove water from the air flow, and means for directing a flow of water within the air intake means away from the air intake duct and out of the air intake means so that water flows readily out of the air intake means, wherein the air intake duct is positioned rearwardly of the means for directing the flow of water.

* * * * *